C. WILLMOTT.
SOLDERING TOOL.
APPLICATION FILED AUG. 30, 1912.

1,099,957.

Patented June 16, 1914.

Witnesses.
John C. Sanders,
Albert F. Heuman.

Inventor:
Charles Willmott
By
Att'y.

COLUMBIA PLANOGRAPH CO., WASHINGTON, D. C.

UNITED STATES PATENT OFFICE.

CHARLES WILLMOTT, OF SMETHWICK, ENGLAND.

SOLDERING-TOOL.

1,099,957.   Specification of Letters Patent.   Patented June 16, 1914.

Application filed August 30, 1912. Serial No. 717,842.

*To all whom it may concern:*

Be it known that I, CHARLES WILLMOTT, a subject of His Majesty the King of Great Britain and Ireland, residing at 124 Park Road, Bearwood, Smethwick, in the county of Stafford, England, have invented a new and useful Improvement in Soldering-Tools, of which the following is a specification.

This invention has reference to blow pipes for use in soldering aluminium and comprises an improvement in or connected with the same whereby the soldering process is considerably facilitated.

According to this invention the nozzle end of the blow pipe is provided with and has fixed to it a short tool which I call a conducting scraper as said tool is adapted to serve the two purposes of scraping the surface of the aluminium where the solder is to be applied and simultaneously leading the solder along the same as it is melted by the blow pipe. The acting end of the conducting scraper is made of various forms according to the particular surface whether flat, angle shaped or curved to which the solder is to be applied.

My invention is illustrated by the accompanying drawings on which—

Figure 1:
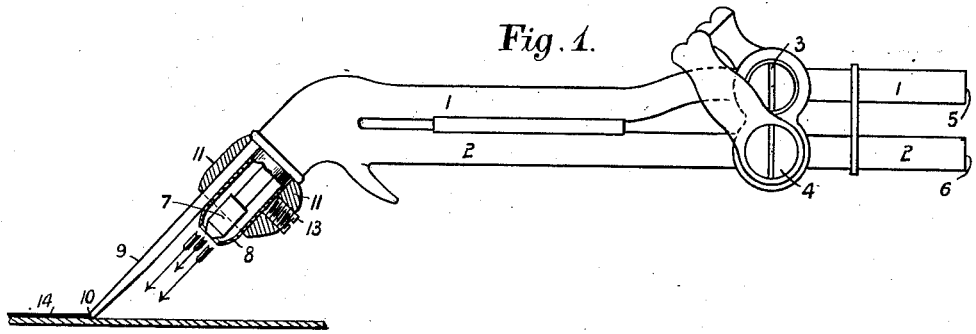
Figure 2:
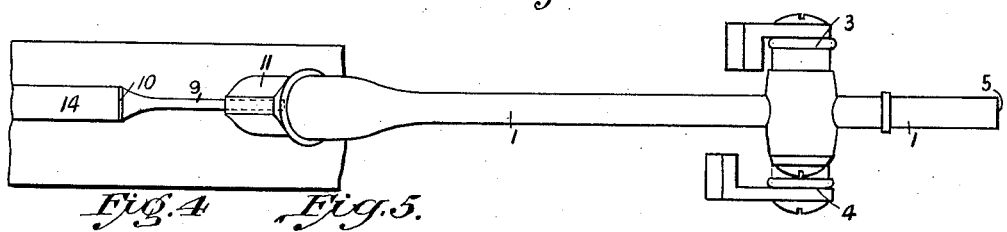
Figures 4, 5:
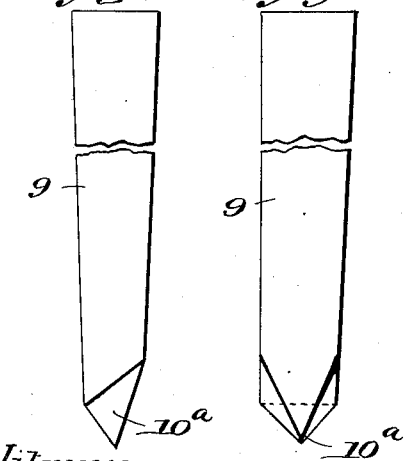
Figure 3:
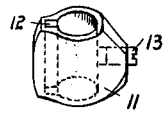

Figure 1 is a side elevation partly in section of an ordinary hard soldering gas blow pipe with my invention applied thereto, this view showing also in cross section a piece of aluminium to the surface of which the aluminium solder is being applied; Fig. 2 is a plan of the parts shown in Fig. 1; Fig. 3 is a perspective view separately of the socket like attachment which secures the conducting scraper to the nozzle of the blow pipe; Fig. 4 is a side elevation of a modified form of conducting scraper for use when applying the solder along an angle as formed by two plates; and Fig. 5 is a front elevation of the conducting scraper shown in Fig. 4.

The hard soldering gas blow pipe represented on my drawings forms *per se* no part of my invention and as is well known it comprises the air pipe 1 and the gas pipe 2 combined together and each furnished with a separate controlling cock which cocks are marked respectively 3 and 4. The end 5 of the air pipe 1 is connected to the air supply under pressure and the end 6 of the pipe 2 is connected to the gas supply. At the front part of the blow pipe there is the compound nozzle comprising the central air nozzle 7 in communication with the air pipe 1, and the larger gas nozzle 8, the interior of which communicates with the gas pipe 2, so that the air issuing through the nozzle 7 is surrounded by the gas issuing through the annular space between the interior of the nozzle 8 and the exterior of the nozzle 7 thus forming the blow pipe flame for heating the aluminium to be soldered and the solder therefor.

In carrying out this invention I combine with the blow pipe nozzle a conducting scraper 9 which is fixed to the outside of the nozzle and projects in a line therewith for some little distance in front of the outlet. The outer end 10 of the conducting scraper is made like the end of a chisel or graver for the purpose of scraping the surface of the aluminium plate to which the solder is to be applied. The conducting scraper can conveniently be formed of square section steel and is by preference fixed to the nozzle by means of the revoluble socket or collar 11 which is bored to fit on the said nozzle and is made with a longitudinal key-way or slot 12 in which the shank of the conducting scraper fits, and opposite to this key-way the socket 11 is tapped and furnished with a set screw 13 which when tightened up against the nozzle secures the socket 12 and the conducting scraper in position on the nozzle as shown in Figs. 1 and 2.

In using the combined gas blow pipe and conducting scraper the gaseous mixture issuing from the nozzle is lighted and the combined tool is so held that the conducting scraper is inclined to the surface to which the solder is to be applied as shown for instance in Figs. 1 and 2 and then the portion of the aluminium solder is placed at the commencement of the joint or strip to be soldered and when melted the combined blow pipe and conducting scraper are drawn backwardly so that the melted solder 14 will, by its contact with the lower end of the conducting scraper 9, be conducted backwardly along the surface to be soldered simultaneously with the scraping of that surface by the conducting scraper. Thus it will be seen that by using my invention the operation of soldering aluminium is, by the conducting scraper being carried by the blow pipe, considerably facilitated.

As before stated the acting or conducting end of the conducting scraper has to be made of various shapes to suit the particular surface to which the aluminium solder is to be applied, that is to say if the surface is flat then the chisel shaped end of the conducting scraper as shown in Figs. 1 and 2 will be found most suitable, or if the surface is round then the conducting scraper should be rounded to suit, or if it is in an angle that the solder is to be applied, then the end 10ª of the conducting scraper should be made of angular shape as shown in Figs. 4 and 5 so as to fit into the angle in which the solder is to be run.

What I claim as my invention and desire to secure by Letters Patent is:—

In a solder tool for aluminium the combination with the straight nozzle of a blow pipe of a one piece tubular socket 11 having a rectangular slot 12 formed therein, a solder conducting scraper having a shank of rectangular section adjustably held in said socket, the scraper being prevented from turning in the socket, said scraper being longitudinally and axially adjustable with the socket relatively to the blow pipe so that the scraper is a constant distance from the axis of the blow pipe nozzle, said one piece socket completely embracing the nozzle of the blow pipe and the scraper and being secured to the nozzle by a set screw.

In testimony whereof I have signed my name in this specification in the presence of two subscribing witnesses.

CHARLES WILLMOTT.

Witnesses:
 CHARLES BOSWORTH KETLEY,
 BERTHA MATILDA DEELEY.

Copies of this patent may be obtained for five cents each, by addressing the "Commissioner of Patents, Washington, D. C."